United States Patent
Shinozaki

(10) Patent No.: US 10,864,688 B2
(45) Date of Patent: Dec. 15, 2020

(54) METHOD AND APPARATUS OF MODULAR PUNCH FORMING PLATES FOR ALIGNMENT OF A STRINGER FOR A VEHICLE

(71) Applicant: The Boeing Company, Chicago, IL (US)

(72) Inventor: John Makoto Shinozaki, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 309 days.

(21) Appl. No.: 15/963,193

(22) Filed: Apr. 26, 2018

(65) Prior Publication Data

US 2019/0329508 A1    Oct. 31, 2019

(51) Int. Cl.
| B29C 70/46 | (2006.01) |
| B29C 70/54 | (2006.01) |
| B29K 307/04 | (2006.01) |
| B29K 309/08 | (2006.01) |
| B29L 31/30 | (2006.01) |

(52) U.S. Cl.
CPC .............. *B29C 70/46* (2013.01); *B29C 70/54* (2013.01); *B29K 2307/04* (2013.01); *B29K 2309/08* (2013.01); *B29L 2031/30* (2013.01)

(58) Field of Classification Search
CPC ................................ B29C 70/46; B29C 70/54
See application file for complete search history.

(56) References Cited

U.S. PATENT DOCUMENTS

| 2,693,011 A | 11/1954 | Femberg |
| 6,306,239 B1 | 10/2001 | Breuer et al. |
| 6,495,086 B1 | 12/2002 | Uytterhaeghe et al. |
| 8,465,613 B2 | 6/2013 | Rotter et al. |
| 8,551,382 B2 | 10/2013 | Anderson et al. |
| 8,557,165 B2 | 10/2013 | Jones et al. |
| 8,601,694 B2 | 12/2013 | Brennan et al. |
| 9,162,380 B2 | 10/2015 | Jones et al. |

(Continued)

FOREIGN PATENT DOCUMENTS

| EP | 2508326 A1 | 10/2012 |
| EP | 2561979 A2 | 2/2013 |

(Continued)

OTHER PUBLICATIONS

EP Office Action dated Oct. 14, 2019 in re EP Application No. 19164970.6 filed Mar. 25, 2019.

(Continued)

*Primary Examiner* — Matthew J Daniels
*Assistant Examiner* — Andrew L Swanson
(74) *Attorney, Agent, or Firm* — Coats & Bennett, PLLC

(57) ABSTRACT

Methods and devices of fabricating a stringer for a vehicle. The stringer can be constructed from two charges that are formed together into the stringer. During fabricating, the ends of the charges can be formed in a die cavity. When the ends are misaligned in the die cavity, one of the charges can be moved in the die cavity to align the ends. The device used for fabricating the charges can include a punch with separate punch plates that move the ends of the charges into the die cavity. The punch plates can be separately moved to adjust the position of the charges and align the ends.

20 Claims, 14 Drawing Sheets

(56) References Cited

U.S. PATENT DOCUMENTS

| | | |
|---|---|---|
| 9,162,396 B2 | 10/2015 | Coxon et al. |
| 9,254,619 B2 | 2/2016 | Rotter et al. |
| 9,387,627 B2 | 7/2016 | Brennan et al. |
| 9,387,628 B2 | 7/2016 | Chapman et al. |
| 9,561,602 B2 | 2/2017 | Jones et al. |
| 2004/0265536 A1* | 12/2004 | Sana ............... B29C 70/541 428/119 |
| 2009/0320995 A1 | 12/2009 | Menendez Martin et al. |
| 2013/0174396 A1 | 7/2013 | Torres Martinez |
| 2013/0340928 A1* | 12/2013 | Rotter ............... B29C 70/46 156/214 |
| 2014/0103585 A1 | 4/2014 | Coxon et al. |
| 2015/0174831 A1 | 6/2015 | Miguez Charines et al. |
| 2015/0183503 A1 | 7/2015 | Miguez Charines et al. |
| 2017/0008217 A1 | 1/2017 | Chapman et al. |
| 2018/0093431 A1 | 4/2018 | Forston et al. |
| 2019/0329856 A1 | 10/2019 | Shinozaki |

FOREIGN PATENT DOCUMENTS

| | | |
|---|---|---|
| EP | 2868465 A1 | 5/2015 |
| EP | 2982500 A1 | 2/2016 |
| WO | 2015011316 A1 | 1/2015 |

OTHER PUBLICATIONS

European Search Report dated Oct. 9, 2019 in re EP Application No. 19157346.8.

European Search Report dated Nov. 19, 2019 in re EP Application No. 19164961.5.

* cited by examiner

METHOD AND APPARATUS OF MODULAR PUNCH FORMING PLATES FOR ALIGNMENT OF A STRINGER FOR A VEHICLE

TECHNOLOGICAL FIELD

The present disclosure generally relates to a process of stringer fabrication. More particularly, the present disclosure relates to devices and methods for aligning blade tips of charges during fabrication of a composite stringer for a vehicle.

BACKGROUND

Composite reinforcing substructures such as stringers, sometimes referred to as blade stiffeners, are frequently used in the marine and aircraft industries. These stringers can be fabricated by combining two or more charges. The stringer includes a blade section and a flange section with opposing flanges that extend outward from each side of the blade section.

During the fabrication process, the charges can be formed into an L-shaped cross-section. This forming includes forcing ends of each of the charges into a die cavity to form the blade section. The ends of the charges inserted into the die cavity and that form the blade section should be aligned in the die cavity. In the event the tips become misaligned, resin can pool at the end of the blade section during curing. The pooled resin can experience cracking when the stringer is exposed to certain thermal cycles at extreme temperatures.

SUMMARY

One aspect is directed to a method of fabricating a composite stringer for a vehicle. The method includes positioning first and second charges at a die cavity formed between first and second form blocks. The method includes inserting a first punch plate into the die cavity and driving a first end of the first charge along the first form block and into the die cavity, and inserting a second punch plate into the die cavity and driving a first end of the second charge along the second form block and into the die cavity. The method includes moving the first punch plate relative to the second punch plate when the first ends are misaligned and moving the first charge relative to the first form block and aligning the first ends of the first and second charges in the die cavity. The method also includes that while the aligned first ends are in the die cavity, forming flanges at second ends of the first and second charges. The method includes moving the first and second punch plates out of the die cavity, and compressing the first and second charges between the first and second form blocks.

In another aspect, the method also includes adhering the first charge to the first punch plate to prevent relative movement between the first charge and the first punch plate and moving the first charge along the first form block while driving the first end of the first charge into the die cavity.

In another aspect, the method also includes adhering the second charge to the second punch plate to prevent relative movement between the second charge and the second punch plate and moving the second charge along the second form block while driving the first end of the second charge into the die cavity.

In another aspect, the method also includes heating the first and second charges prior to driving the first ends of the first and second charges into the die cavity.

In another aspect, the method includes contacting the first punch plate against the second punch plate while moving the first punch plate into the die cavity.

In another aspect, the method includes simultaneously inserting the first and second punch plates into the die cavity.

In another aspect, the method also includes positioning material sheets on each of the first and second form blocks prior to inserting the first and second charges into the die cavity with the material sheets having a lower adherence value relative to the first and second charges than the first and second punch plates.

In another aspect, moving the first punch plate relative to the second punch plate and moving the first charge relative to the first form block and aligning the first ends of the first and second charges in the die cavity includes moving each of the first punch plate and the first end of the first charge farther into the die cavity.

One aspect is directed to a method of fabricating a composite stringer for a vehicle. The method includes positioning first and second charges over a die cavity formed between first and second form blocks. The method includes contacting the first and second charges with a punch and driving a first end of each of the charges into the die cavity. The method includes that when the first ends are misaligned in the die cavity, moving a first section of the punch that is adhered to the first charge relative to a second section of the punch that is adhered to the second charge and moving the first charge and aligning the first end of the first charge with the first end of the second charge in the die cavity. The method includes that while the aligned first ends are in the die cavity, forming flanges with second end sections of the first and second charges. The method includes removing the punch from the die cavity, and compressing together the charges in the die cavity.

In another aspect, the method also includes positioning a sheet on each of the first and second form blocks with the sheets having a lower adherence value than surfaces of the first and second form blocks to prevent adherence of the first charge to the first form block and the second charge to the second form block when the first ends of each of the charges are driven into the die cavity and aligned.

In another aspect, the method also includes sliding the first charge against the sheet on the first form block and sliding the second charge against the sheet on the second form block while driving the first end of each of the charges into the die cavity.

In another aspect, contacting the first and second charges with the punch and driving the first end of each of the charges into the die cavity includes contacting a first punch plate section against the first charge and driving the first charge into the die cavity and separately contacting a second punch plate section against the second charge and driving the second charge into the die cavity.

In another aspect, moving the first section of the punch that is adhered to the first charge relative to a second section of the punch that is adhered to the second charge and moving the first charge and aligning the first end of the first charge with the first end of the second charge in the die cavity includes moving the first section of the punch farther into the die cavity and moving the first end of the first charge farther into the die cavity.

In another aspect, the method also includes displaying on a display monitor relative positions of the first ends of the first and second charges in the die cavity.

In another aspect, the method is for a panel of a vehicle manufactured according to the method.

In another aspect, the method is for a vehicle with a panel manufactured according to the method.

One aspect is directed to a device to fabricate a composite stringer for a vehicle. The device includes a die cavity formed between first and second form blocks. First and second punch plates are positioned in proximity to the die cavity with each of the first and second punch plates including an inner face, an outer face, and a contact edge that extends between the inner and outer faces with the first and second punch plates being positioned with the inner faces facing together and the contact edges closer to the die cavity than an opposing edges. A first flange plate is positioned at and transverse to the outer face of the first punch plate and a second flange plate is positioned at and transverse to the outer face of the second punch plate. One or more actuators are operatively connected to the first and second punch plates to individually move each of the punch plates relative to the die cavity and relative to each other between a first position with the contact edge positioned out of the die cavity and a second position with the contact edge positioned in the die cavity.

In another aspect, the inner faces of the first and second punch plates are in contact.

In another aspect, the one or more actuators are operatively connected to the first and second flange plates to individually move each of the first and second flange plates relative to each other and towards and away from the first and second form blocks.

In another aspect, the device includes sensors configured to detect a relative position in the die cavity between ends of the first and second charges.

DETAILED DESCRIPTION

The present disclosure includes methods and devices of fabricating a stringer for a stiffened stringer panel. The stringer can be constructed from two charges that are formed together into the stringer. During fabricating, the ends of the charges can be formed in a die cavity. When the ends are misaligned in the die cavity, one of the charges can be moved in the die cavity to align the ends. The device used for fabricating the charges can include a punch with separate punch plates that move the ends of the charges into the die cavity. The punch plates can be separately moved to adjust the position of the charges and align the ends.

Figure 1:
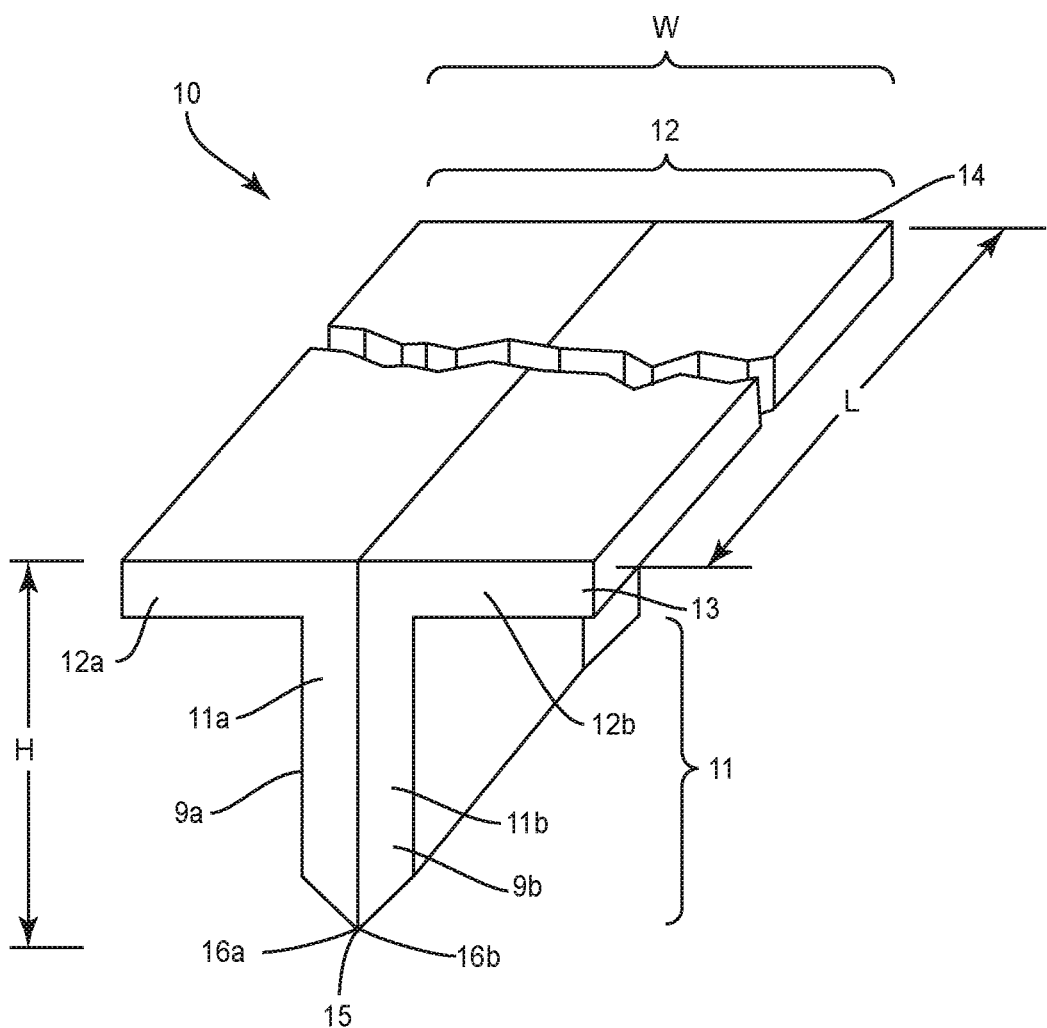
FIG. 1 is a perspective view of a stringer.

FIG. 1 illustrates a sectional view of a stringer 10 that is formed by a first charge 9a and a second charge 9b that are positioned in a back-to-back orientation. The first charge 9a includes a blade 11a and a flange 12a. Likewise, the second charge 9b includes a blade 11b and a flange 12b. The charges 9a, 9b can include the same or different shapes and/or sizes. The charges 9a, 9b can be constructed from the same or different materials. One stringer 10 includes each of the charges 9a, 9b formed from one or more plies of composite material, such as but not limited to carbon fiber reinforced plastic (CFRP), carbon fiber reinforced polymer, carbon fiber reinforced thermoplastic, and fiberglass reinforced plastic (FRP).

The stringer 10 includes a T-shape cross section with a blade section 11 formed by blades 11a, 11b and a flange section 12 formed by flanges 12a, 12b. The flanges 12a, 12b can each be aligned at the same angle relative to the blade section 11 or can be aligned at different angles. In one design as illustrated in FIG. 1, the flange section 12 is perpendicular to the blade section 11. Other designs include the flange section 12 being at non-perpendicular angles relative to the blade section 11. The stringer 10 can include lengths L that extend between a first and second ends 13, 14. The height H measured between a tip 15 of the blade section 11 and top of the flange section 12 can also vary. A width W measured along the flange section 12 can also vary. The thicknesses of the blade sections 11 and flange sections 12 can also vary. The stringer 10 can also include a composite filler material (not illustrated) positioned between the blades 11a, 11b.

Figure 2:
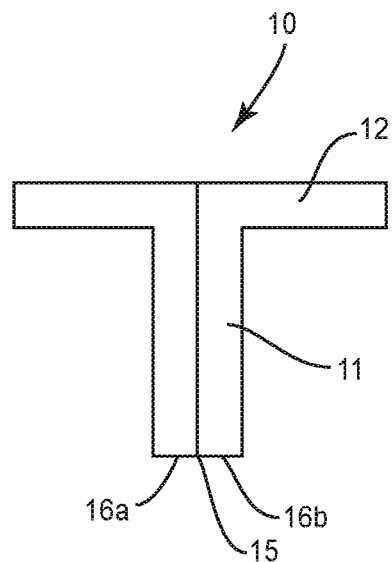
FIG. 2 is an end view of a stringer.
Figure 3:
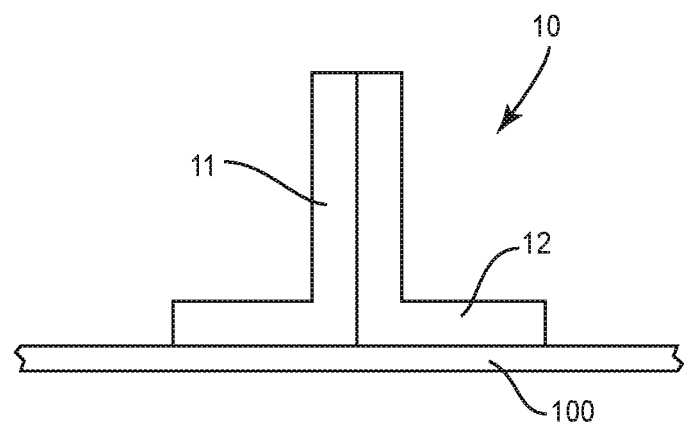
FIG. 3 is an end view of a stringer attached to a wing skin of a vehicle.

The tip 15 of the blade section 11 includes ends 16a, 16b of the charges 9a, 9b. The tip 15 can include different shapes depending upon the use, including but not limited to a pointed shape as illustrated in FIG. 1 and a flat shape as illustrated in FIG. 2. The ends 16a, 16b of the charges 9a, 9b should be aligned to prevent resin pooling. The stringer 10 can be used in a variety of contexts. FIG. 3 includes the stringer 10 connected to a panel 100, such as but not limited to the wing skin, fuselage, and airframe of a vehicle.

Figure 4:
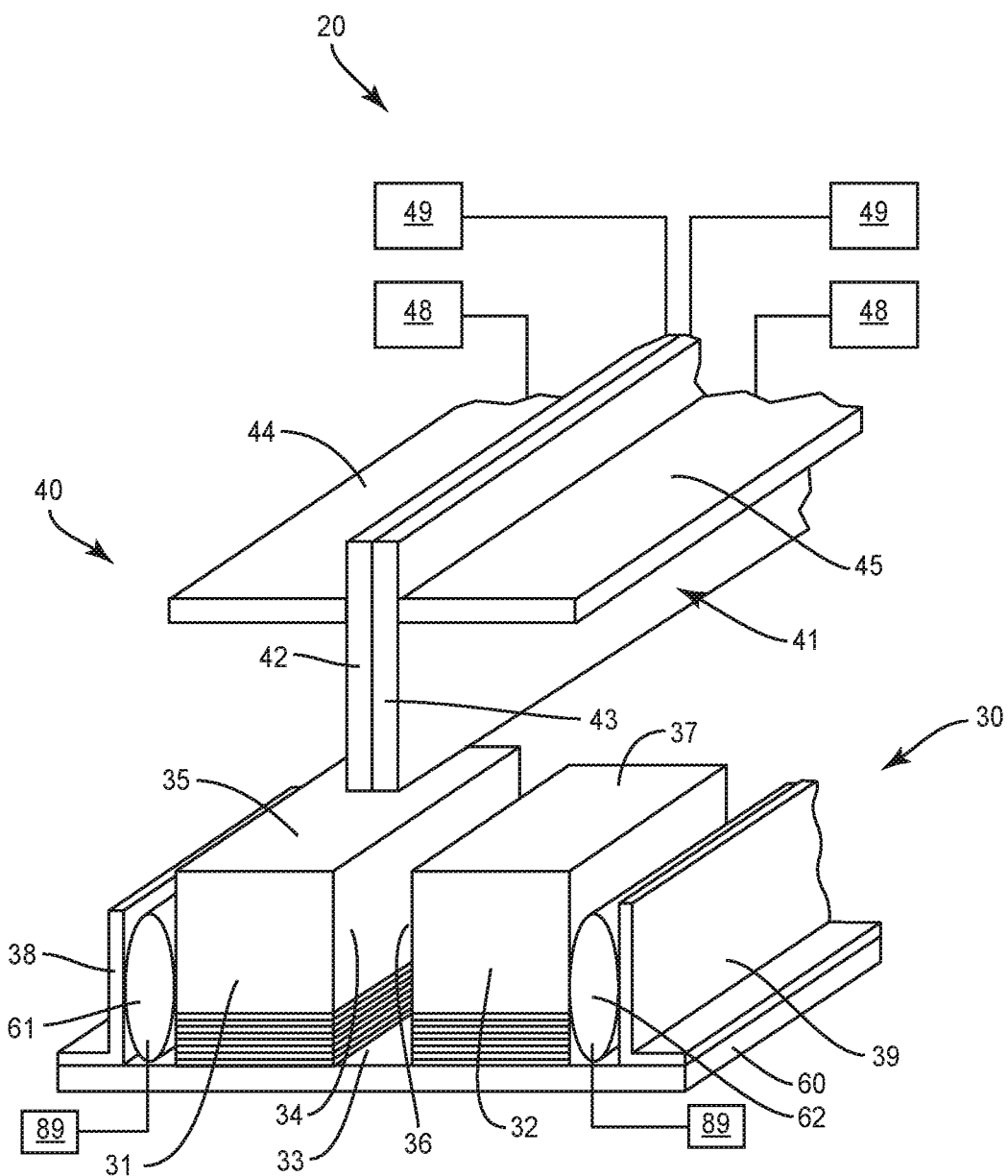
FIG. 4 is a perspective view of a tooling assembly.

FIG. 4 illustrates a tooling assembly 20 employed to form the stringers 10. The tooling assembly 20 generally includes a die assembly 30 and a punch assembly 40.

The die assembly 30 includes a pair of form blocks 31, 32 that are spaced apart to form a die cavity 33. The form blocks 31, 32 can be constructed from relatively rigid material, such as but not limited to wood, metal, ceramic or a composite. The first form block 31 includes an inner surface 34 and a top surface 35. Likewise, the second form block 32 includes an inner surface 36 and a top surface 37.

A pair of L-shape, elongated brackets 38, 39 are mounted on a plate 60 on opposite sides of form blocks 31, 32. The brackets 38, 39 retain the form blocks 31, 32 on the plate 60 as well as react lateral forming forces generated by the form blocks 31, 32. One or more actuators 89 can move the form blocks 31, 32 to adjust a width of the die cavity 33. A pair of inflatable hoses 61, 62 sometimes referred to as bags or bladders are sandwiched between the brackets 38, 39 and the form blocks 31, 32. The hoses 61, 62 are configured to be coupled with a suitable source of pressurized air (not shown) to be pressurized in order to apply a lateral force on the form blocks 31, 32 during the fabrication processes. Other mechanisms can be provided to apply lateral force to the form blocks 31, 32.

The punch assembly 40 includes a punch 41 that can include a first section of a first punch plate 42 and a second section of a second punch plate 43. One or more actuators 49 are configured to power the punch plates 42, 43 into and out of the die cavity 33. The punch plates 42, 43 are configured to move separately and relative to each other. The first punch plate 42 can move into and out of the die cavity 33 regardless of the position and movement of the second punch plate 43. Likewise, the second punch plate 43 can move into and out of the die cavity 33 regardless of the position and movement of the first punch plate 42. The punch plates 42, 43 can move simultaneously during the fabrication (e.g., both punch plates 42, 43 are aligned and move at the same time into the die cavity 33) or can move at different times (e.g., first punch plate 42 is moved into the die cavity 33 followed by the second punch plate 43 being moved into the die cavity 33).

The inner sides of the punch plates 42, 43 can abut together and slide across each other during relative movement. The inner sides can be flat to facilitate the relative movement. Alternatively, the punch plates 42, 43 can be spaced apart by a gap. The punch plates 42, 43 can be formed of a suitable rigid material, such as but not limited to metal, ceramic or a composite.

The punch assembly 40 also includes first and second flange plates 44, 45. Each of the flange plates 44, 45 extends transversely outward from the respective first and second punch plates 42, 43. This can include the flange plates 44, 45 being perpendicular to the first and second punch plates 42, 43. One or more actuators 48 move the flange plates 44, 45 up and down along the punch plates 42, 43 to form the flanges 12a, 12b as will be explained below. The flange plates 44, 45 can move independently or the flange plates 44, 45 can move together.

Figure 5:
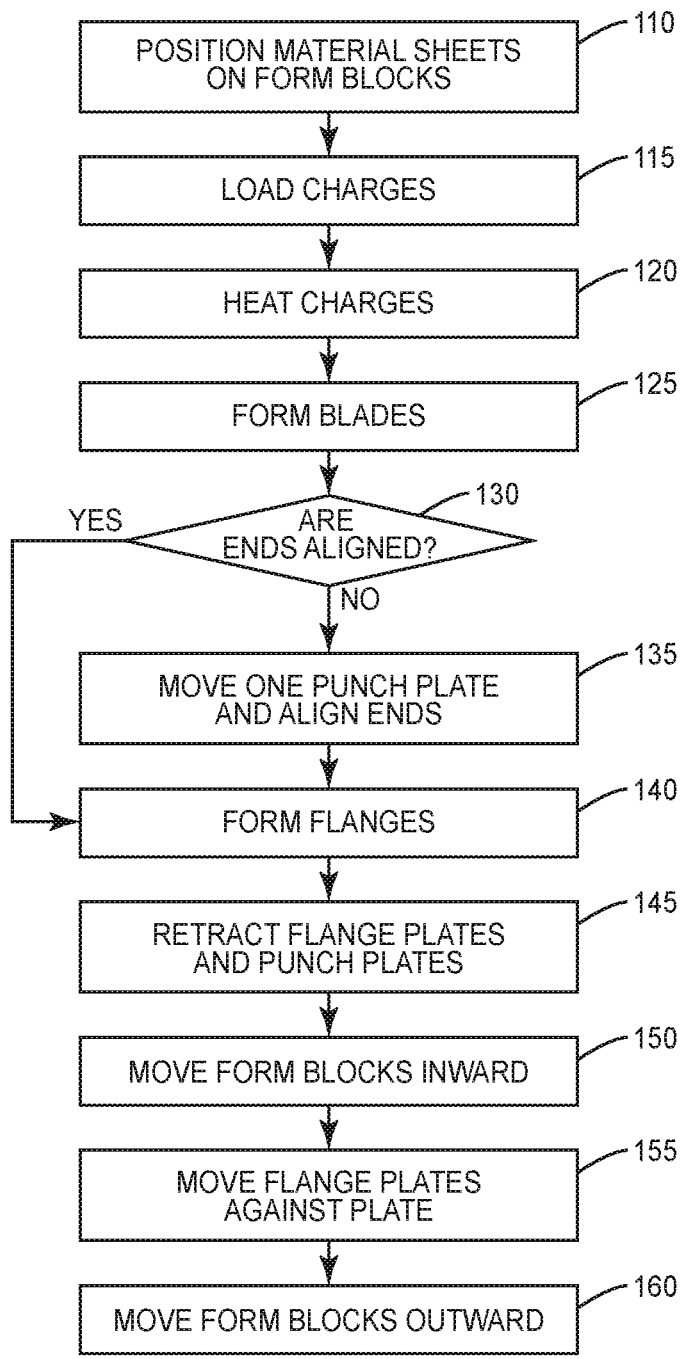
FIG. 5 is a flowchart diagram of a method of fabricating a composite stringer for a vehicle.
Figure 6:
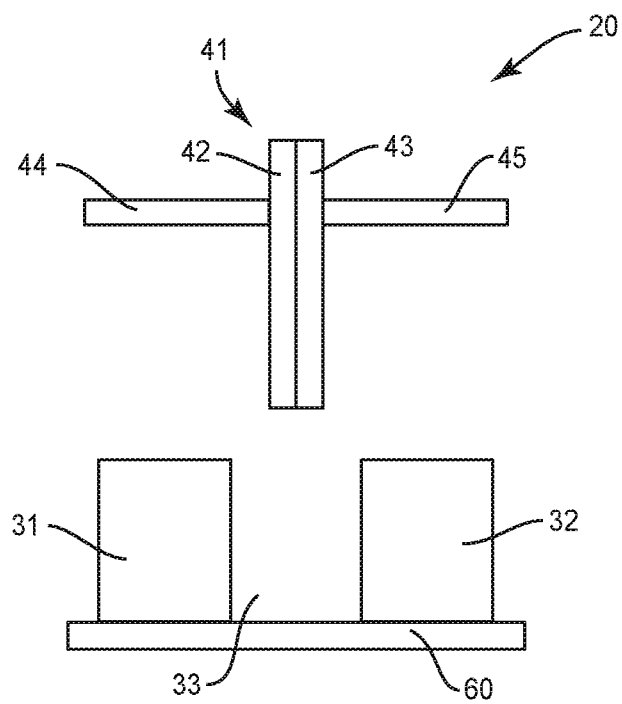
FIGS. 6-16 are schematic illustrations of steps of fabricating a composite stringer for a vehicle using the tooling assembly shown in FIG. 4.

FIG. 5 includes a flowchart of the steps of fabricating a stringer 10. FIGS. 6-16 illustrate the individual steps and correspond to the flowchart. FIG. 6 illustrates the tooling assembly 20 in preparation for the fabrication process. The punch 41 that includes the first and second punch plates 42, 43 is elevated above the die cavity 33 formed between the form blocks 31, 32. The flange plates 44, 45 are also elevated above the form blocks 31, 32.

Figure 7:
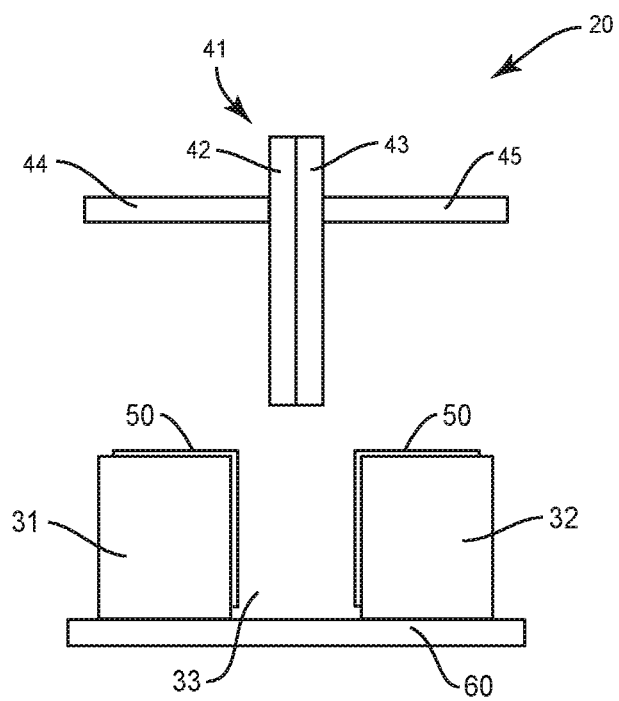

As illustrated in FIG. 7, material sheets 50 are positioned on each of the form blocks 31, 32 (block 110). The material sheets 50 are constructed from material that has a lower adherence value relative to the first and second charges 9a, 9b than the first and second punch plates 42, 43. The material sheets 50 provide for the first and second charges 9a, 9b to slide along the first and second form blocks 31, 32 respectively when adhered to the first and second punch plates 42, 43. The material sheets 50 can be constructed from a variety of materials, including but not limited to Teflon. The material sheets 50 are sized to extend over the inner surface 34 and top surface 35 of the form block 31 and the inner surface 36 and top surface 37 of the form block 32. The material sheets 50 can extend over an entirety or limited section of these surfaces.

Figure 8:
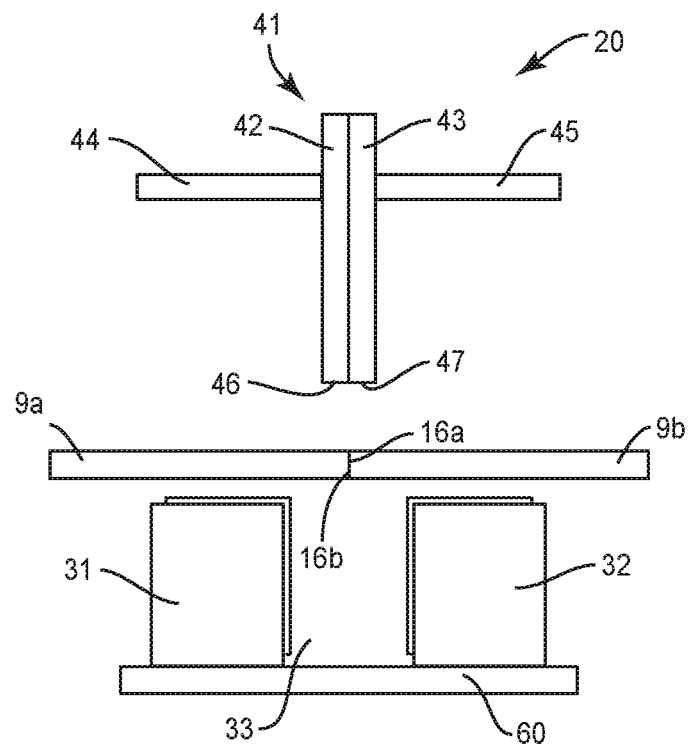

As illustrated in FIG. 8, flat, multi-ply composite charges 9a, 9b are loaded onto the form blocks 31, 32 while the first and second punch plates 42, 43 are in elevated positions (block 115). The first and second punch plates 42, 43 can be positioned with ends 46, 47 being aligned. The first and second charges 9a, 9b are positioned with the ends 16a, 16b abutting together and centered over the die cavity 33.

Figure 9:
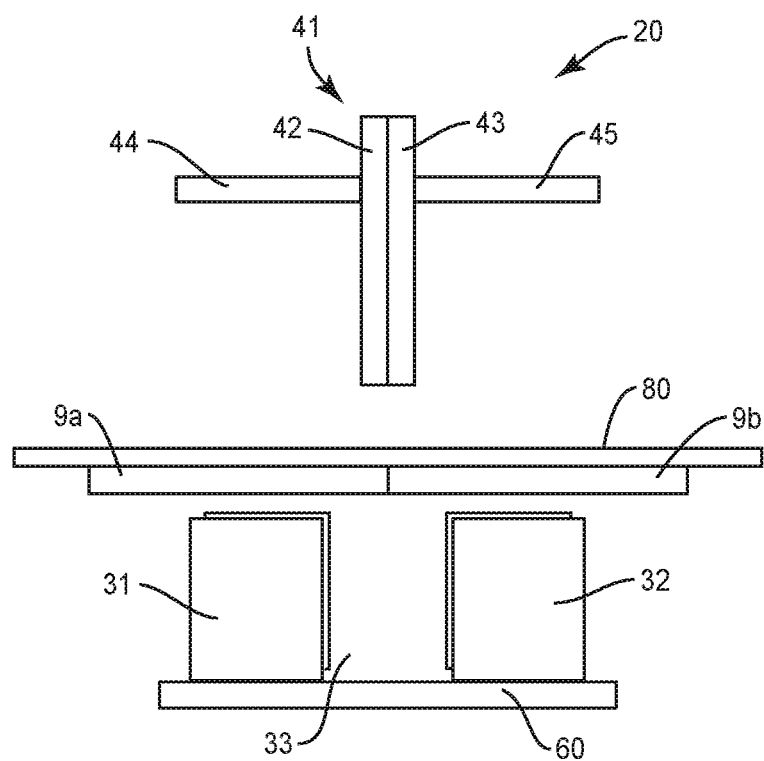

The charges 9a, 9b can be heated (block 120). FIG. 9 illustrates a heating blanket 80 loaded onto the charges 9a, 9b. The heating blanket 80 heats the charges 9a, 9b which can make the resin more liquid which can facilitate forming the charges 9a, 9b. In one design, the charges 9a, 9b are maintained at a lower temperature and stored at a low temperature. The charges 9a, 9b are removed from the storage and placed on the tooling assembly 20 which is in an environment with a higher temperature. The charges 9a, 9b can be elevated in temperature due to exposure in the warmer environment and/or other means such as the heating blanket 80 or exposure to radiant or inductive type heaters. Heating also increases an adherence between the punch plates 42, 43 and the charges 9a, 9b from a very low cold temperature state where the resin tends to be hard and less sticky. If necessary, adherence can also be accomplished using mechanical aspects, such as but not limited to notches in one of the punch plates 42, 43 or charges 9a, 9b that engage with the opposing member. Mechanical fasteners can also be used to adhere the charges 9a, 9b to the punch plates 42, 43.

Figure 10:
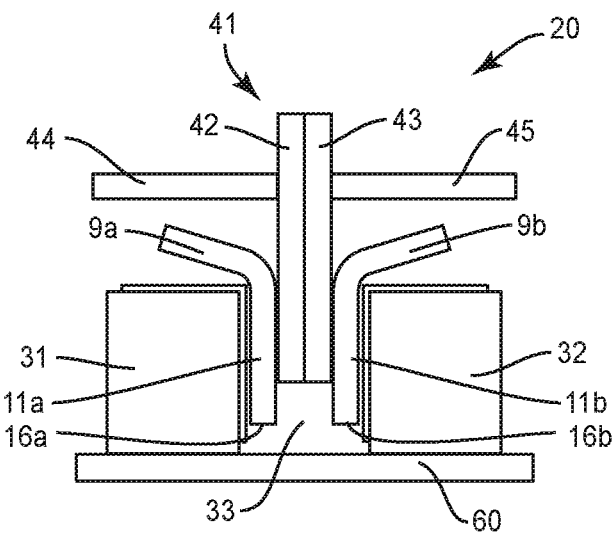

The first and second punch plates 42, 43 are then moved into the die cavity 33 to form the blades 11a, 11b (block 125) and illustrated in FIG. 10. During the movement, the first and second punch plates 42, 43 contact against and drive the ends 16a, 16b and center sections of the first and second charges 9a, 9b into the die cavity 33. This movement begins to form the blades 11a, 11b of the charges 9a, 9b in the die cavity 33.

As the first and second punch plates 42, 43 contact against first and second charges 9a, 9b, the charges 9a, 9b adhere to the punch plates 42, 43. This can be caused by the tackiness of the charges 9a, 9b. Thus, the charges 9a, 9b adhere to and move with the punch plates 42, 43. The charges 9a, 9b slide along the surfaces of the form blocks 31, 32 due to the contact with the material sheets 50 as the adherence value is lower between the charges 9a, 9b and the material sheets 50 than between the charges 9a, 9b and the punch plates 42, 43.

Figure 11:
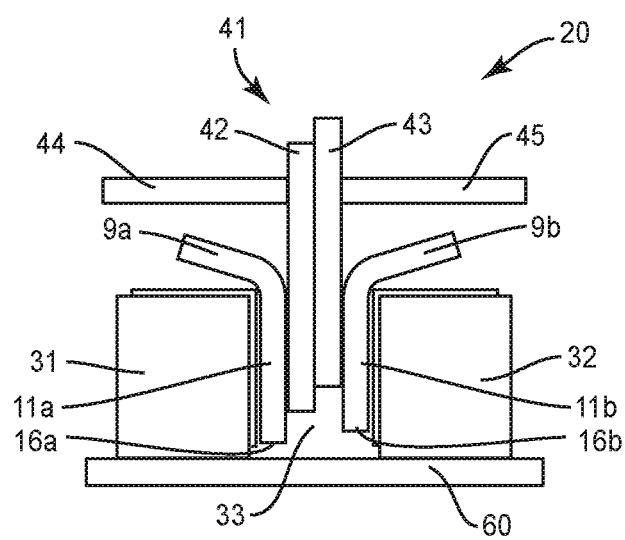

The position of the ends 16a, 16b in the die cavity 33 is then determined (block 130). If the ends 16a, 16b are aligned, no relative adjustment is necessary. When the ends 16a, 16b are misaligned, the relative positioning of the ends 16a, 16b is adjusted. As illustrated in FIG. 11, the misalignment can be caused by one of the ends 16a, 16b being positioned deeper into the die cavity 33.

Figure 12:
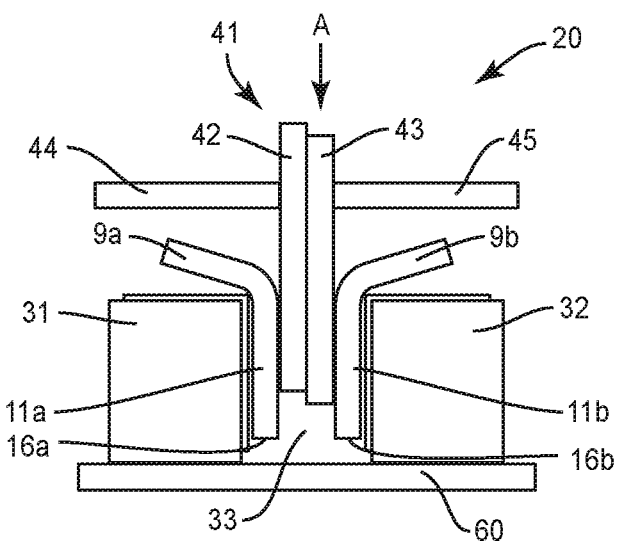

To align the ends 16a, 16b one of the punch plates 42, 43 is moved relative to the other punch plate 42, 43 (block 135). This can include moving the punch plate 42, 43 that is adhered to the charge 9a, 9b positioned upward in the die cavity 33 an additional amount into the die cavity 33. In the example of FIG. 11, this would include moving punch plate 43 and corresponding charge 9b deeper into the die cavity 33. As illustrated in FIG. 12, punch plate 43 is moved relative to punch plate 42 farther into the die cavity 33 as illustrated by arrow A. The punch plate 43 is moved a distance into the die cavity 33 until the ends 16a, 16b are aligned. During the movement, punch plate 42 and corresponding charge 9a can be stationary.

As described above, the alignment can include moving the punch plate 42, 43 of the more-elevated charge 9a, 9b an additional amount into the die cavity 33. This moves the shallower one of the charges 9a, 9b farther into the die cavity 33 and into alignment with the other charge 9a, 9b. The alignment can also include moving the punch plate 42, 43 adhered to the deeper one of the charges 9a, 9b (i.e., the charge 9a, 9b that is farther into the die cavity 33). In this method, the applicable punch plate 42, 43 is moved a distance out of the die cavity 33 until the ends 16a, 16b are aligned.

The process can include the charges 9a, 9b being fully formed into the die cavity 33. Once formed, the ends 46, 47 can be aligned by individual movement of the punch plates 42, 43 as described above. The process can also include performing an initial first punch by moving the punch plates 42, 43 and corresponding charges 9a, 9b a first amount into the die cavity 33. Once the initial first punch is complete, the ends 46, 47 can be aligned in the die cavity 33 by moving one of the punch plates 42, 43 as described above. After alignment, a second punch can occur that moves the punch plates 42, 43 and corresponding charges 9a, 9b an additional amount deeper into the die cavity 33. Once complete, the ends 46, 47 of the charges 9a, 9b can be aligned by moving the punch plates 42, 43 relative to each other as described above. The overall punch process can include two separate steps, or can include more than two steps with each step forming the charges 9a, 9b deeper into the die cavity 33.

During the punching process, the form blocks 31, 32 remain in position against the charges 9a, 9b as illustrated in FIG. 12.

Figure 13:
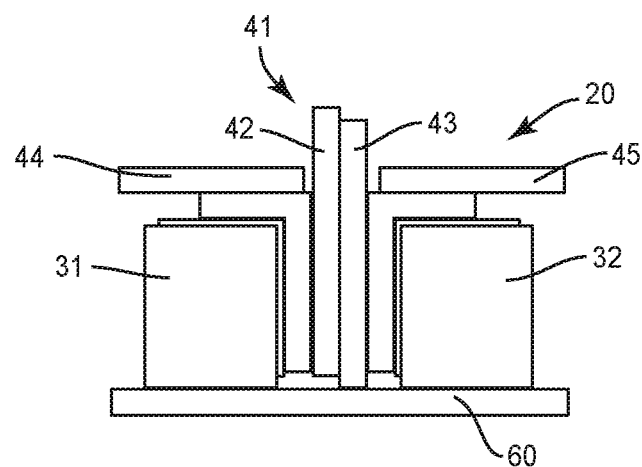

Next, as illustrated in FIG. 13, the flange plates 44, 45 are brought into contact with the charges 9a, 9b to form the flanges 12a, 12b (block 140). The flange plates 44, 45 apply pressure to the charges 9a, 9b to form the flanges 12a, 12b against the top surfaces 35, 37 of the form blocks 31, 32. The flange plates 44, 45 can simultaneously be brought into contact with their respective first and second charges 9a, 9b. The flange plates 44, 45 can also be brought individually into contact with their respective charges 9a, 9b.

Figure 14:
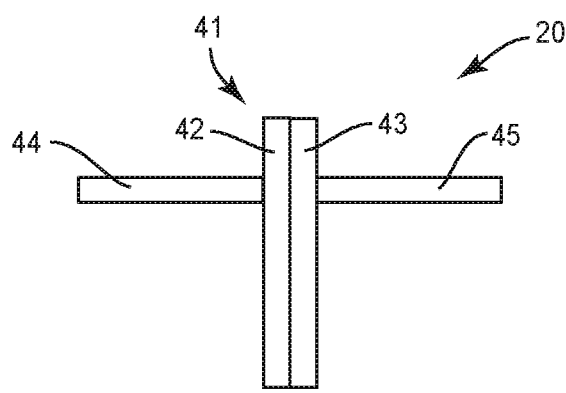
Figure 14:
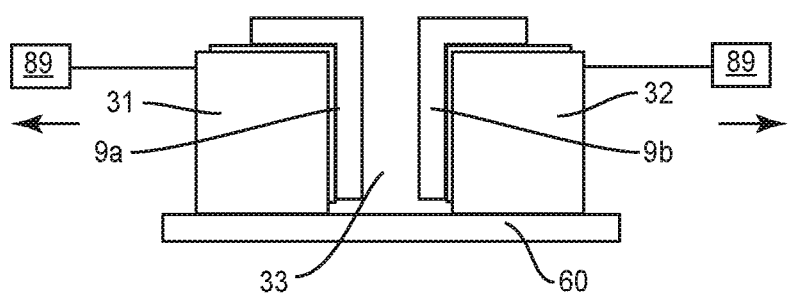

As illustrated in FIG. 14, the form blocks 31, 32 can then be moved outward to expand the die cavity 33. One or more actuators 89 can be connected to the form blocks 31, 32 to control their movement. The punch plates 42, 43 and the flange plates 44, 45 are then retracted upward from the form blocks 31, 32 (block 145). The sequencing of the retraction of the punch plates 42, 43 and flange plates 44, 45 can occur in various orders.

Figure 15:
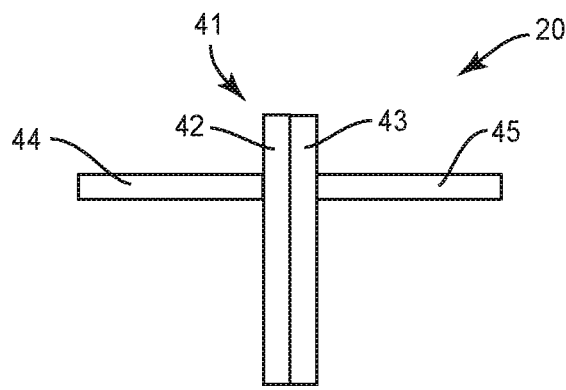
Figure 15:
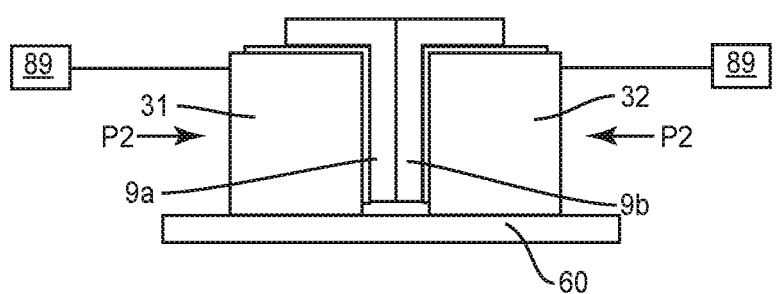
Figure 16:
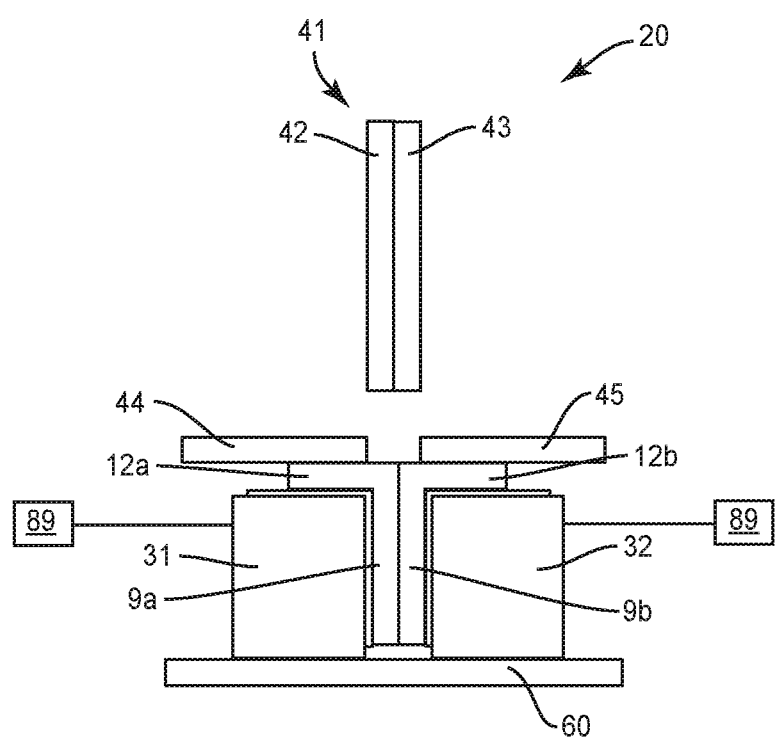

Next, as illustrated in FIG. 15, the form blocks 31, 32 are moved together against the charges 9a, 9b (block 150). The compression forces applied through the form blocks 31, 32 can secure the charges together. If necessary, one or both flange plates 44, 45 can be brought into contact with the charges 9a, 9b as illustrated in FIG. 16 (block 155). Further, a filler material can be placed in a groove formed between the inner sides of the flanges 12a, 12b.

The flange plates 44, 45 can be elevated and the form blocks 31, 32 can be moved outward (block 160). Once released, the stringer 10 can be removed from the die cavity 33.

Figure 17:
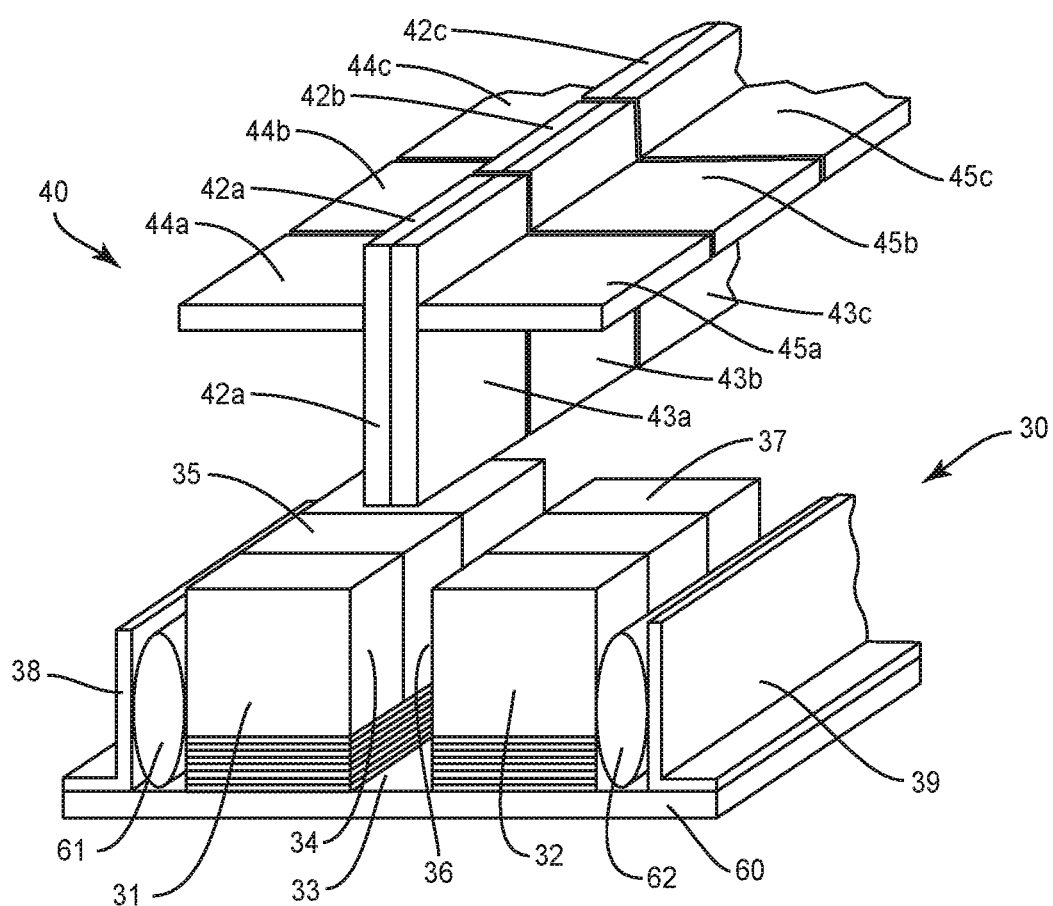
FIG. 17 is a perspective view of a tooling assembly having segmented punch plates and flange plates.

The punch plates 42, 43 and flange plates 44, 45 can be a single component that extends the length of the stringer 10. Actuation includes the entire punch 41 moving into or out of the die cavity 33. As illustrated in FIG. 17, the punch plates 42, 43 and flange plates 44, 45 can be divided into separate segments that extend the length of the stringer 10. The number and size of each of the separate segments can vary. The size of each of the segments can be the same or can be different. Each segment can be moved by an actuator to fabricate the stringer 10 as explained above. The segments can be independently moved relative to the other segments. The punch plates 42, 43 of each segment can be individually adjusted to align the ends 16a, 16b of the charges 9a, 9b. The form blocks 31, 32 can also be divided into separate segments. The separate segments can be the same or different sizes. Further, the segments can be individually moved by one or more actuators as explained above.

Figure 18:
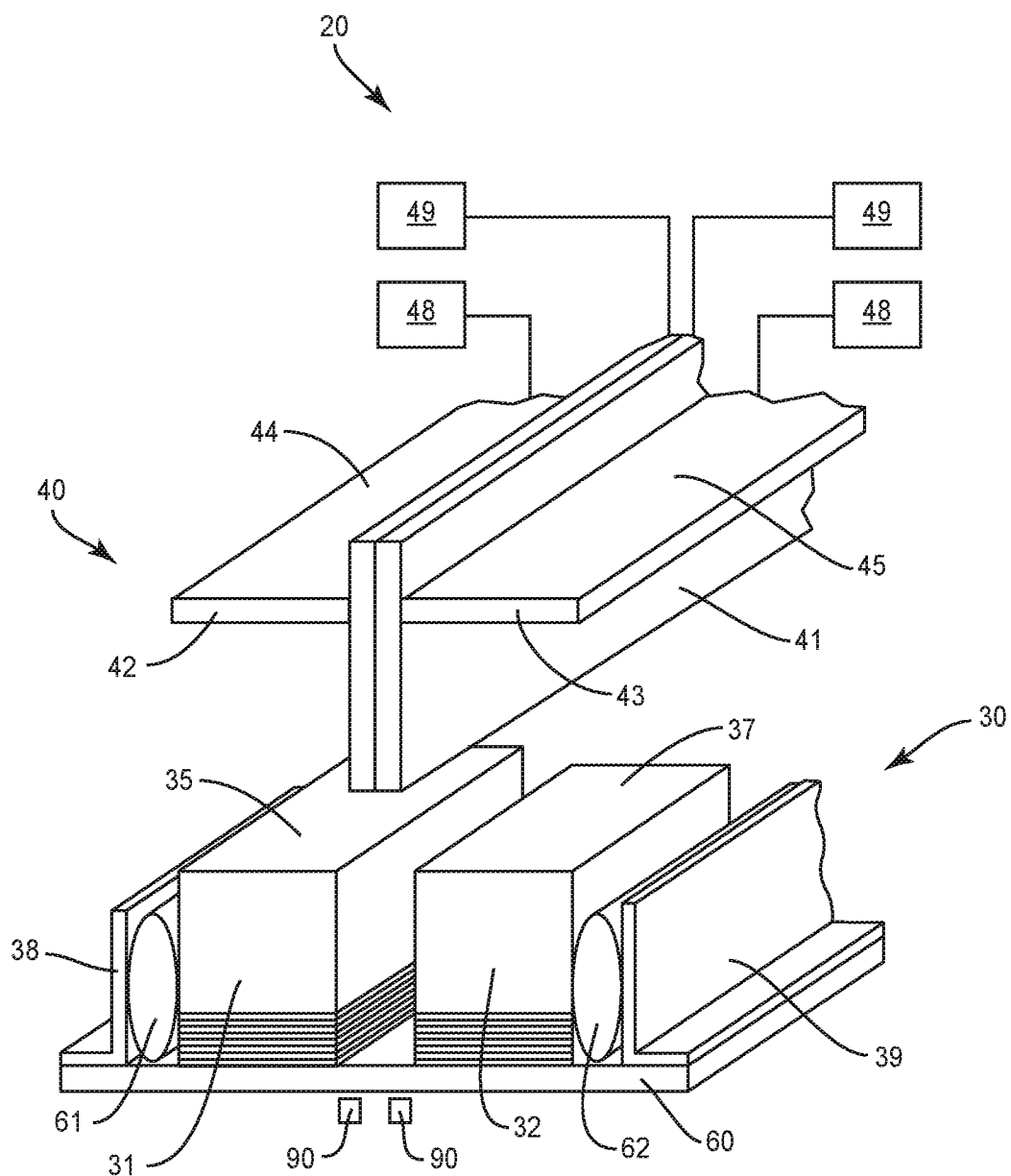
FIG. 18 is a perspective view of sensors positioned at a die cavity of a tooling assembly.

As illustrated in FIG. 18, one or more sensors 90 can be positioned to sense the positions of the ends 16a, 16b in the die cavity 33. Various sensor types may be used, including but not limited to a camera. The one or more sensors 90 can be positioned at various locations along the tooling assembly 20. The position can include one or more sensors 90 positioned at one or both opposing ends of the die cavity 33 to sense alignment of one or both of the inboard and outboard ends of the stringer 10. In segmented punching assemblies (as illustrated in FIG. 17), one or more sensors 90 can be positioned along one or more of the separate component sections.

Figure 19:
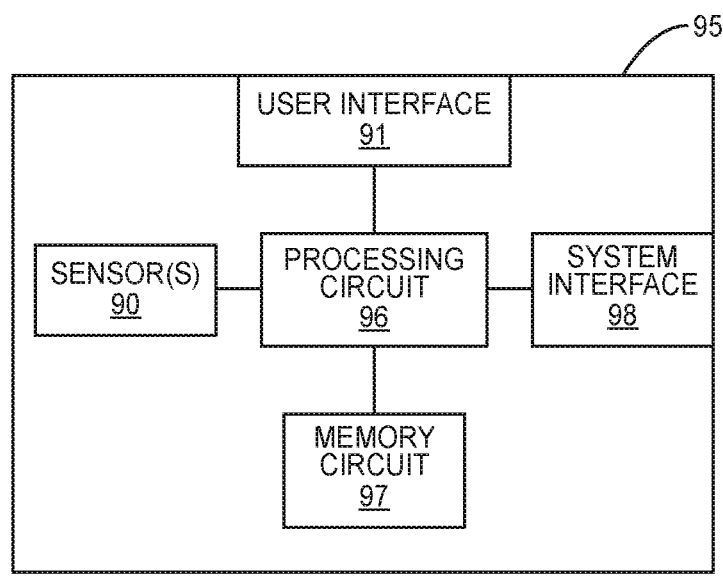
FIG. 19 is a schematic diagram of a control unit.

A control unit 95 that includes the one or more sensors 90 can control the operation of the tooling assembly 20. The control unit 95 can signal control steps to control the various components of the tooling assembly 20. This includes but is not limited to signaling control steps to the actuators 48, 49 that control the punch plates 42, 43 and the flange plates 44, 45. As illustrated in FIG. 19, the control unit 95 includes one or more processing circuits (shown as processing circuit 96) that may include one or more microprocessors, Application Specific Integrated Circuits (ASICs), or the like, configured with appropriate software and/or firmware. A computer readable storage medium (shown as memory circuit 97) stores data and computer readable program code that configures the processing circuit 96 to implement the techniques described above. Memory circuit 97 is a non-transitory computer readable medium, and may include various memory devices such as random access memory, read-only memory, and flash memory.

A user interface 91 includes one or more user input devices such as a keypad, touchpad, function keys, scroll wheel, or other type of computer input device. The user interface 91 can include a display screen, such as a liquid crystal display (LCD) or touch screen display which also functions as a user input device. The user interface 91 provides for the worker to control the functions of the various components that are in communication with the control unit 95.

A system interface 98 is configured to communications with a remote source. This can include a remote control source used by the worker who is remote from the tooling assembly 20. The system interface 98 can include a transceiver configured to wirelessly communicate with the remote source. The system interface 98 can also provide for hardwire connection with the remote source. The system interface 98 may also provide for the supply of power from a remote source. The control unit 95 can also include a power source (not illustrated). The power source can be used in the event of failure of receiving power from the remote source. The power source can also provide power to just one or more limited elements, such as the processing circuit 96 and the memory circuit 97. The power source may be rechargeable battery pack that includes a set of battery cells configured to power electrical equipment.

The alignment of the ends 16a, 16b of the charges 9a, 9b in the die cavity 33 can be an automatic or manual process. In an automatic process, one or more visual identification programs can be stored in the memory circuit 97 and used by the processing circuit 96 to determine the relative alignment of the ends 16a, 16b. The processing circuit 96 can then move the punch plates 42, 43 accordingly to align the ends 16a, 16b. In a manual process, the alignment of the ends 16a, 16b can be shown on a display that is part of the user interface 91. The display can also include a reference (e.g., a ruler). An operator can see the relative positioning of the ends 16a, 16b and then control the punch plates 42, 43 through the user interface 91 to achieve proper alignment and required punch depth of both charges 9a, 9b.

Figure 20:
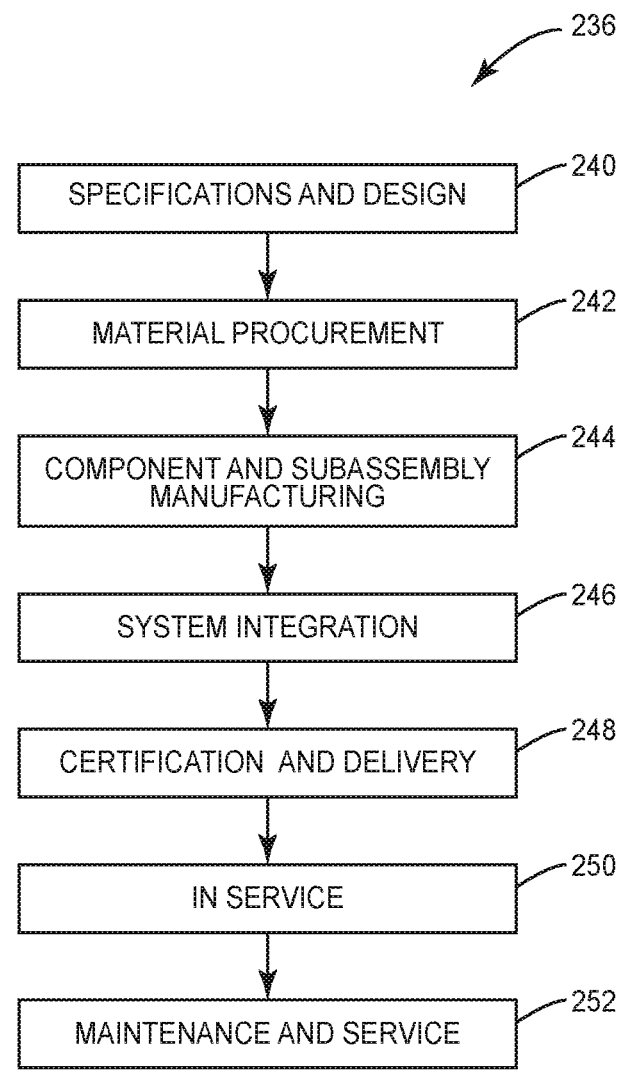
FIG. 20 is a flow diagram of a vehicle production and service methodology.
Figure 21:
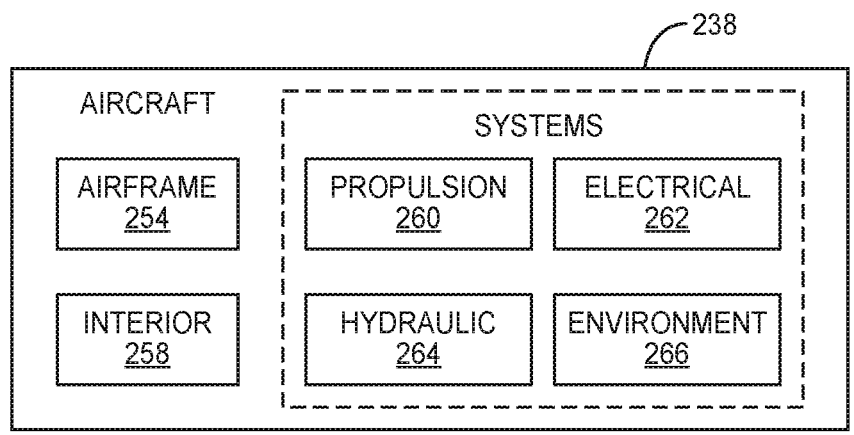
FIG. 21 is a block diagram of a vehicle.

The stringers 10 and fabrication methodologies can being used in a variety of potential applications, particularly in the transportation industry, including for example, aerospace, marine, automotive applications and other application where automated layup equipment can be used. The stringers 10 and methodologies can be used in the context of a vehicle manufacturing and service method 236 as illustrated in FIG. 20 and a vehicle 238 such as an aircraft as illustrated in FIG. 21. During pre-production, exemplary methods 236 can include specification and design 240 of the vehicle 238 and material procurement 242. During production, component and subassembly manufacturing 244 and system integration 246 of the vehicle 238 takes place. Thereafter, the vehicle 238 can go through certification and delivery 248 in order to be placed in service 250. While in service by a customer, the vehicle 238 is scheduled for routine maintenance and service 250, which can also include modification, reconfiguration, refurbishment, and so on.

The processes of method 236 can be performed or carried out by a system integrator, a third party, and/or an operator (e.g., a customer). For the purposes of this description, a system integrator can include without limitation any number of vehicle manufacturers and major-system subcontractors; a third party can include without limitation any number of vendors, subcontractors, and suppliers; and an operator can be an airline, leasing company, military entity, service organization, and so on.

As shown in FIG. 21, the vehicle 238 produced by exemplary method 236 can include an airframe 254 with a plurality of systems 256 and an interior 258. Examples of high-level systems 256 include one or more of a propulsion system 260, an electrical system 262, a hydraulic system 264, and an environmental system 266. Any number of other systems can be included. Although an aerospace example is shown, the principles of the disclosure can be applied to other industries, such as the marine and automotive industries.

Systems and methods embodied herein can be employed during any one or more of the stages of the production and service method 236. For example, components or subassemblies corresponding to component and subassembly manufacturing 244 can be fabricated or manufactured in a manner similar to components or subassemblies produced while the vehicle 238 is in service. Also, one or more apparatus embodiments, method embodiments, or a combination thereof can be utilized during the component and subassembly manufacturing 244 and system integration 246, for example, by expediting assembly of or reducing the cost of a vehicle 238. Similarly, one or more of apparatus embodiments, method embodiments, or a combination thereof can be utilized while the vehicle 238 is in service, for example and without limitation, to maintenance and service 252.

The stringer 10 can be used to support different panels, including but not limited to a wing, airframe, and fuselage of a vehicle. The stringer 10 can be used with a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of fabricating a composite stringer for a vehicle, the method comprising:
    positioning first and second charges at a die cavity formed between first and second form blocks;
    inserting a first punch plate of a punch into the die cavity and driving a first end of the first charge along the first form block and into the die cavity;
    inserting a second punch plate of the punch into the die cavity and driving a first end of the second charge along the second form block and into the die cavity;
    moving the first punch plate relative to the second punch plate when the first ends are misaligned and moving the first charge relative to the first form block and aligning the first ends of the first and second charges in the die cavity;
    when the first ends are aligned in the die cavity, forming flanges at second ends of the first and second charges;
    moving the first and second punch plates out of the die cavity; and
    compressing the first and second charges between the first and second form blocks.

2. The method of claim 1, further comprising adhering the first charge to the first punch plate to prevent relative movement between the first charge and the first punch plate and moving the first charge along the first form block while driving the first end of the first charge into the die cavity.

3. The method of claim 2, further comprising adhering the second charge to the second punch plate to prevent relative movement between the second charge and the second punch plate and moving the second charge along the second form block while driving the first end of the second charge into the die cavity.

4. The method of claim 1, further comprising heating the first and second charges prior to driving the first ends of the first and second charges into the die cavity.

5. The method of claim 1, further comprising contacting the first punch plate against the second punch plate while moving the first punch plate into the die cavity.

6. The method of claim 1, further comprising simultaneously inserting the first and second punch plates into the die cavity.

7. The method of claim 1, further comprising positioning material sheets on each of the first and second form blocks prior to inserting the first and second charges into the die cavity, the material sheets having a lower adherence value relative to the first and second charges than the first and second punch plates.

8. The method of claim 1, wherein moving the first punch plate relative to the second punch plate and moving the first charge relative to the first form block and aligning the first ends of the first and second charges in the die cavity comprises moving each of the first punch plate and the first end of the first charge farther into the die cavity.

9. A method of fabricating a composite stringer for a vehicle, the method comprising:
    positioning first and second charges over a die cavity formed between first and second form blocks;
    contacting the first and second charges with a punch and driving a first end of each of the first and second charges into the die cavity;
    when the first ends are misaligned in the die cavity, moving a first section of the punch that is adhered to the first charge relative to a second section of the punch that is adhered to the second charge and moving the first charge and aligning the first end of the first charge with the first end of the second charge in the die cavity;

forming flanges with second end sections of the first and second charges;

removing the punch from the die cavity; and compressing together the charges in the die cavity.

10. The method of claim 9, further comprising positioning a material sheet on each of the first and second form blocks with the material sheets having a lower adherence value than surfaces of the first and second form blocks to prevent adherence of the first charge to the first form block and the second charge to the second form block when the first ends of the first and second charges are driven into the die cavity and aligned.

11. The method of claim 10, further comprising sliding the first charge against the material sheet on the first form block and sliding the second charge against the material sheet on the second form block while driving the first ends of each of the first and second charges into the die cavity.

12. The method of claim 9, wherein contacting the first and second charges with the punch and driving the first ends of each of the first and second charges into the die cavity comprises contacting a first punch plate section against the first charge and driving the first charge into the die cavity and separately contacting a second punch plate section against the second charge and driving the second charge into the die cavity.

13. The method of claim 9, wherein moving the first section of the punch that is adhered to the first charge relative to a second section of the punch that is adhered to the second charge and moving the first charge and aligning the first end of the first charge with the first end of the second charge in the die cavity comprises moving the first section of the punch farther into the die cavity and moving the first end of the first charge farther into the die cavity.

14. The method of claim 9, further comprising displaying on a display monitor relative positions of the first ends of the first and second charges in the die cavity.

15. The method of claim 1, further comprising elevating the first and second punch plates above the die cavity while loading the first and second charges onto the first and second form blocks.

16. The method of claim 1, further comprising maintaining the second ends of the first and second charges out of the die cavity while driving the first ends of the first and second charges into the die cavity.

17. The method of claim 1, further comprising moving the first punch plate into the die cavity an additional amount more than the second punch plate and aligning the first end of the first charge with the first end of the second charge.

18. The method of claim 9, further comprising aligning the first ends of the first and second charges in the die cavity prior to forming the flanges.

19. The method of claim 9, further comprising heating the first and second charges prior to driving the first ends of the first and second charges into the die cavity.

20. The method of claim 9, wherein aligning the first end of the first charge with the first end of the second charge in the die cavity comprises moving the first charge an additional amount in the die cavity than the second punch.

* * * * *